United States Patent
Tagore (10) Patent No.: US 9,614,773 B1
(45) Date of Patent: Apr. 4, 2017

(54) SYSTEMS AND METHODS FOR AUTOMATICALLY CORRECTING CLASSIFICATION SIGNATURES

(71) Applicant: Juniper Networks, Inc., Sunnyvale, CA (US)

(72) Inventor: Kalyana Prakash Ravindranath Tagore, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 479 days.

(21) Appl. No.: 14/210,313

(22) Filed: Mar. 13, 2014

(51) Int. Cl.
 *H04L 12/851* (2013.01)
(52) U.S. Cl.
 CPC .............................. *H04L 47/2441* (2013.01)
(58) Field of Classification Search
 CPC combination set(s) only.
 See application file for complete search history.

(56) References Cited

U.S. PATENT DOCUMENTS

| | | | | |
|---|---|---|---|---|
| 7,543,052 B1* | 6/2009 | Cesa Klein | ........... | H04L 43/026 709/223 |
| 8,494,985 B1 | 7/2013 | Keralapura et al. | | |
| 8,514,865 B2* | 8/2013 | Sharma | ............... | H04L 12/2874 370/395.42 |
| 8,577,817 B1 | 11/2013 | Keralapura et al. | | |
| 8,670,334 B2* | 3/2014 | Keohane | ................ | G06Q 30/02 370/252 |
| 8,694,630 B1* | 4/2014 | Keralapura | ......... | H04L 47/2441 709/223 |
| 8,843,627 B1* | 9/2014 | Baldi | .................... | H04L 43/026 709/224 |
| 8,971,345 B1* | 3/2015 | McCanne | ........... | H04L 47/6215 370/412 |
| 2003/0156586 A1* | 8/2003 | Lee | ......................... | H04L 69/22 370/392 |
| 2004/0073694 A1* | 4/2004 | Frank | ...................... | H04L 47/10 709/232 |
| 2006/0092845 A1* | 5/2006 | Kwan | ................. | H04L 12/5693 370/235 |
| 2009/0238071 A1 | 9/2009 | Ray et al. | | |
| 2012/0144025 A1* | 6/2012 | Melander | ............ | H04L 47/2441 709/224 |
| 2014/0064080 A1* | 3/2014 | Stevens | ............... | H04L 47/2441 370/235 |

FOREIGN PATENT DOCUMENTS

WO WO-2011/049450 4/2011

* cited by examiner

*Primary Examiner* — Mounir Moutaouakil
(74) *Attorney, Agent, or Firm* — FisherBroyles, LLP (57) ABSTRACT

A computer-implemented method for automatically correcting classification signatures may include (1) identifying at least one classification signature used to classify network traffic, (2) detecting at least one unknown flow of network traffic, (3) determining that the unknown flow of network traffic and the classification signature exceed a threshold level of similarity by comparing the unknown flow with the classification signature, and then in response to determining that the unknown flow and the classification signature exceed the threshold level of similarity, (4) identifying at least one attribute of the unknown flow that differs from the classification signature, and (5) modifying the classification signature based at least in part on the attribute of the unknown flow. Various other systems, methods, and computer-readable media are also disclosed.

18 Claims, 8 Drawing Sheets

| Analysis Table 700 | INTERVAL 1 | INTERVAL 2 | INTERVAL 3 | INTERVAL 4 |
|---|---|---|---|---|
| NUMBER OF UNKNOWN FLOWS THAT ARRIVED | 10,000 | 10,000 | 10,000 | 10,000 |
| NUMBER OF UNKNOWN FLOWS THAT EXCEED THRESHOLD LEVEL OF SIMILARITY | 3000 | 3000 | 1000 | 3000 |
| NUMBER OF UNKNOWN FLOWS THAT MATCH NEW CLASSIFICATION SIGNATURES | 0 | 100 | 1000 | 2000 |
| NUMBER OF DISSIMILAR FLOWS | 7000 | 6900 | 8000 | 5000 |
| SIMILARITY COUNTER FOR PREEXISTING CLASSIFICATION SIGNATURES | Signature 114(1) : 1<br>Signature 114(2) : 1<br>Signature 114(3) : 0<br>Signature 114(4) : 0<br>Signature 114(5) : 0 | Signature 114(1) : 2<br>Signature 114(2) : 1<br>Signature 114(3) : 1<br>Signature 114(4) : 1<br>Signature 114(5) : 0 | Signature 114(1) : 3<br>Signature 114(2) : 1<br>Signature 114(3) : 1<br>Signature 114(4) : 2<br>Signature 114(5) : 1 | Signature 114(1) : 4<br>Signature 114(2) : 1<br>Signature 114(3) : 2<br>Signature 114(4) : 3<br>Signature 114(5) : 1 |
| MATCH COUNTER FOR NEW CLASSIFICATION SIGNATURES | N/A | Signature 614(1) : 1 | Signature 614(1) : 2<br>Signature 614(2) : 0 | Signature 614(1) : 2<br>Signature 614(2) : 1 |

SYSTEMS AND METHODS FOR AUTOMATICALLY CORRECTING CLASSIFICATION SIGNATURES

BACKGROUND

Classification signatures are often used to classify traffic encountered within a computer network. For example, a network may include a router that encounters a sequence of packets travelling from a source device to a destination device. Upon encountering this sequence of packets, the router may apply a Deep Packet Inspection (DPI) technique that involves checking the sequence of packets against a set of classification signatures. Once the router has matched the sequence of packets with one of the classification signatures within the set, the router may classify the sequence of packets as originating from a specific application identified by the matching classification signature.

Unfortunately, the accuracy of some classification signatures may decrease under certain conditions. For example, a classification signature that corresponds to a specific version of an application may be unable to recognize and/or classify packets originating from a newer version of the application. Additionally or alternatively, a classification signature that corresponds to an American version of an application may be unable to recognize and/or classify packets originating from a Chinese version of the application.

The instant disclosure, therefore, identifies and addresses a need for systems and methods for automatically correcting classification signatures to account for varying versions of applications encountered within a network.

SUMMARY

As will be described in greater detail below, the instant disclosure generally relates to systems and methods for automatically correcting classification signatures. In one example, a computer-implemented method for automatically correcting classification signatures may include (1) identifying at least one classification signature used to classify network traffic, (2) detecting at least one unknown flow of network traffic, (3) determining that the unknown flow of network traffic and the classification signature exceed a threshold level of similarity by comparing the unknown flow with the classification signature, and then in response to determining that the unknown flow and the classification signature exceed the threshold level of similarity, (4) identifying at least one attribute of the unknown flow that differs from the classification signature, and (5) modifying the classification signature based at least in part on the attribute of the unknown flow.

As another example, a system for implementing the above-described method may include (1) an identification module that identifies at least one classification signature used to classify network traffic, (2) a detection module that detects at least one unknown flow of network traffic, (3) a determination module that determines that the unknown flow of network traffic and the classification signature exceed a threshold level of similarity by comparing the unknown flow with the classification signature, and (4) a modification module that, in response to the determination that the unknown flow and the classification signature exceed the threshold level of similarity, (a) identifies at least one attribute of the unknown flow that differs from the classification signature and then (b) modifies the classification signature based at least in part on the attribute of the unknown flow. The system may also include at least one processor that executes the identification module, the detection module, the determination module, and the modification module.

In an additional example, the above-described method may be encoded as computer-readable instructions on a non-transitory computer-readable medium. For example, a computer-readable medium may include one or more computer-executable instructions that, when executed by at least one processor of a computing device, cause the computing device to (1) identify at least one classification signature used to classify network traffic, (2) detect at least one unknown flow of network traffic, (3) determine that the unknown flow of network traffic and the classification signature exceed a threshold level of similarity by comparing the unknown flow with the classification signature, and then in response to determining that the unknown flow and the classification signature exceed the threshold level of similarity, (4) identify at least one attribute of the unknown flow that differs from the classification signature and (5) modify the classification signature based at least in part on the attribute of the unknown flow.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for automatically correcting classification signatures. As will be explained in greater detail below, by determining that an unknown flow of network traffic and a classification signature exceed a threshold level of similarity, the various systems and methods described herein may determine that the unknown flow likely originated from an application related to the classification signature (e.g., from a different version of the application identified by the classification signature). Upon determining that the unknown flow likely originated from an application related to the classification signature, the various systems and methods described herein may identify at least one attribute of the unknown flow that differs from the classification signature and then modify the classification signature based at least in part on the attribute of the unknown flow. In doing so, the various systems and methods described herein may automatically correct this classification signature to account for varying versions of the application encountered within a network, thereby increasing the accuracy of the classification signature.

Figure 1:
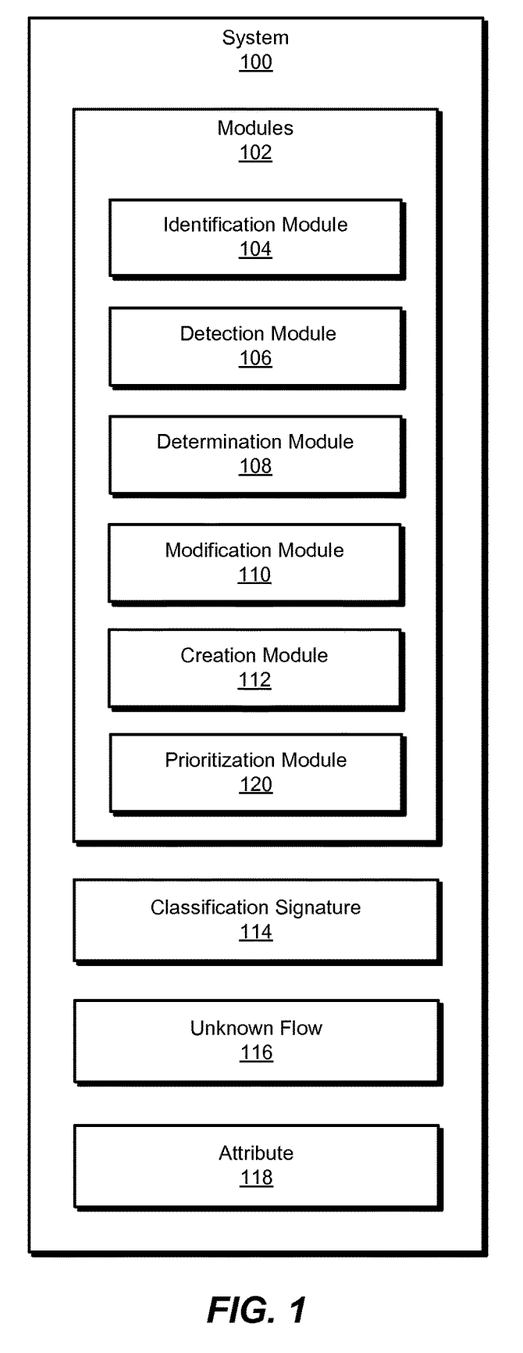
FIG. 1 is a block diagram of an exemplary system for automatically correcting classification signatures.
Figure 2:
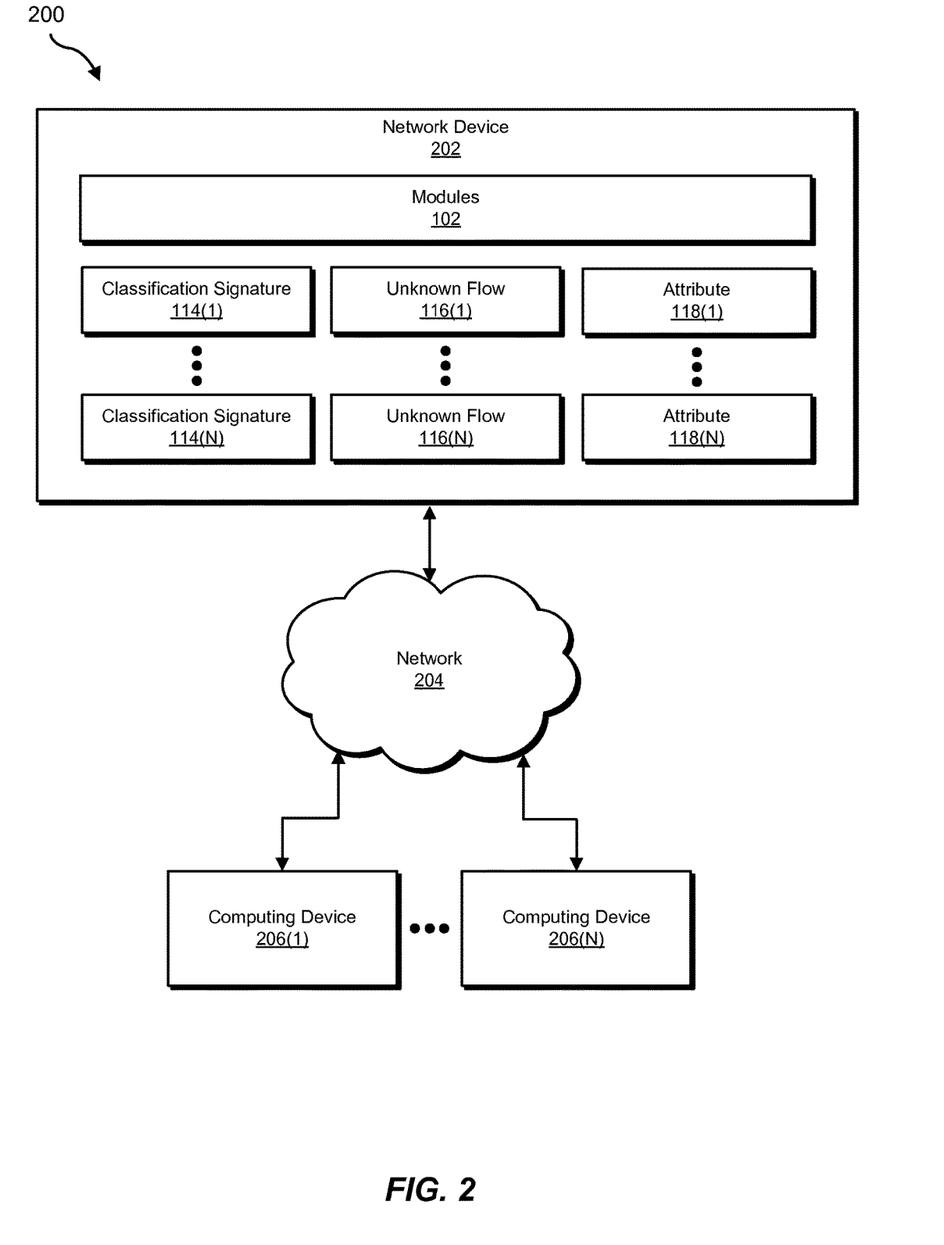
FIG. 2 is a block diagram of an additional exemplary system for automatically correcting classification signatures.
Figure 5:
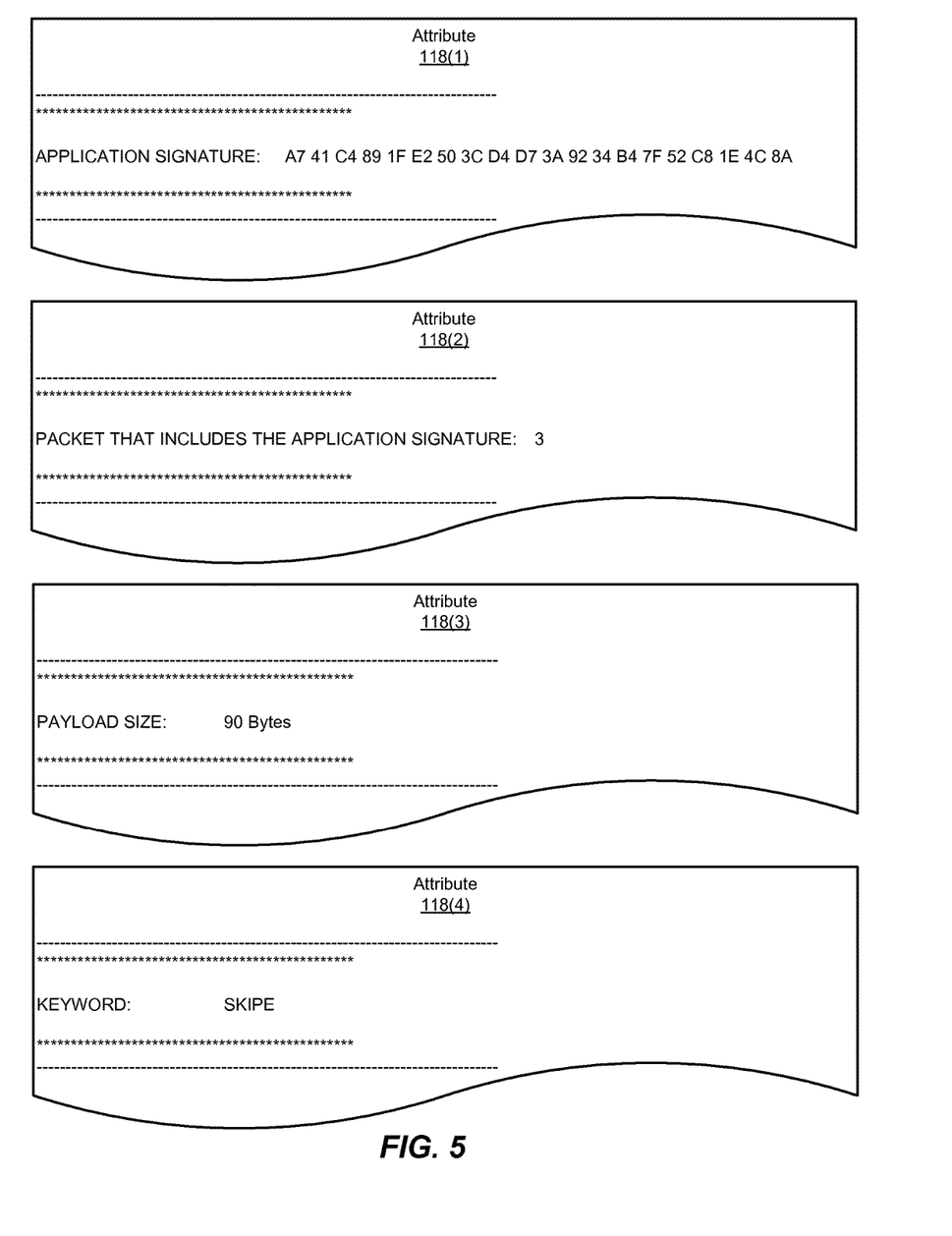
FIG. 5 is an illustration of exemplary attributes of an unknown flow of network traffic.
Figure 6:
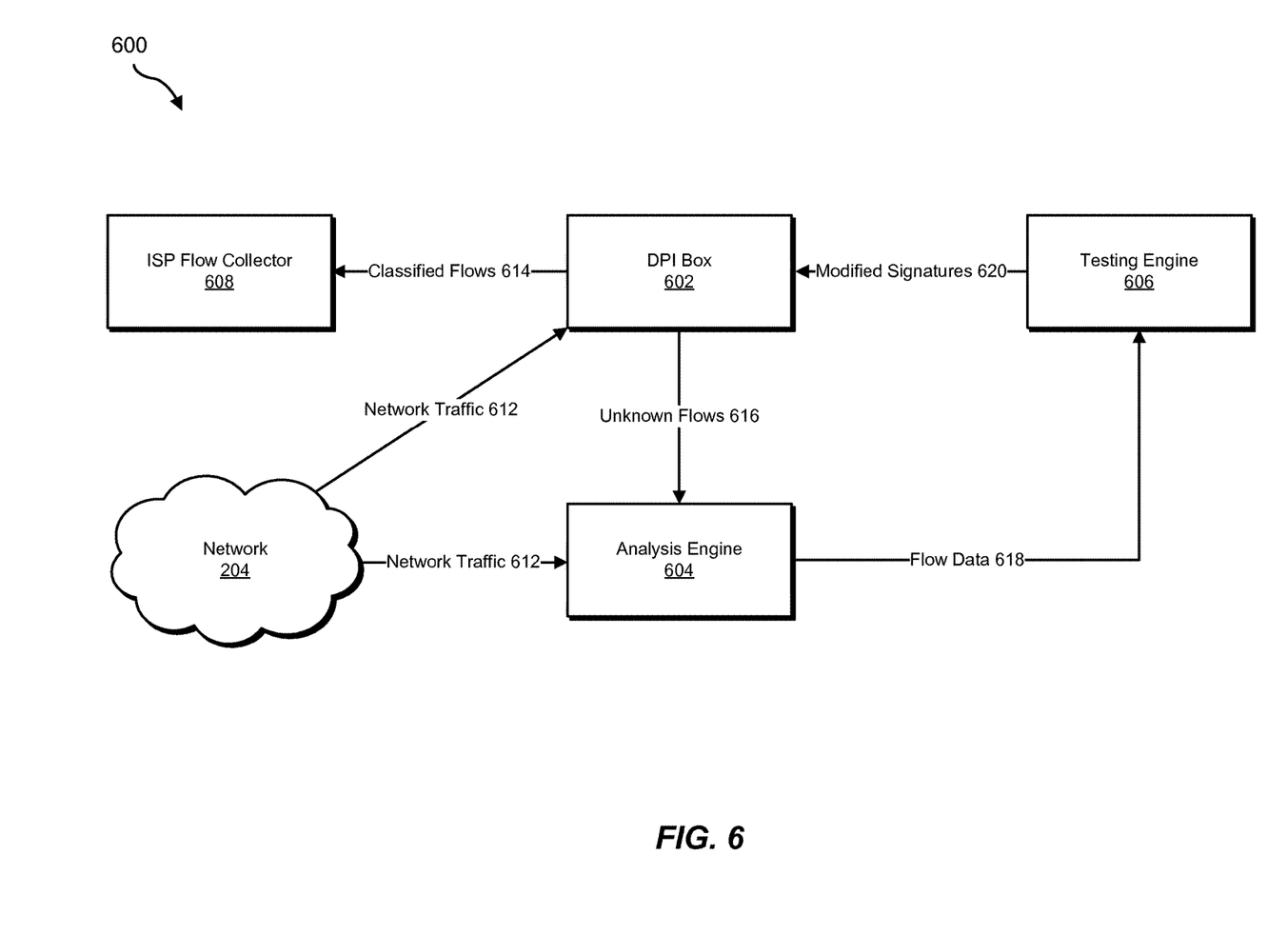
FIG. 6 is a block diagram of an exemplary system for automatically correcting classification signatures.

The following will provide, with reference to FIGS. 1-2 and 6, detailed descriptions of exemplary systems for automatically correcting classification signatures. Detailed descriptions of corresponding computer-implemented methods will be provided in connection with FIG. 3. Detailed descriptions of an exemplary classification signature, exemplary attributes of an unknown flow, and an exemplary analysis table will be provided in connection with FIGS. 4, 5, and 7, respectively. In addition, detailed descriptions of an exemplary computing system capable of implementing one or more of the embodiments described herein will be provided in connection with FIG. 8.

FIG. 1 is a block diagram of an exemplary system 100 for automatically correcting classification signatures. As illustrated in this figure, exemplary system 100 may include one or more modules 102 for performing one or more tasks. For example, and as will be explained in greater detail below, exemplary system 100 may include an identification module 104 that identifies at least one classification signature used to classify network traffic. Exemplary system 100 may also include a detection module 106 that detects at least one unknown flow of network traffic.

In addition, exemplary system 100 may include a determination module 108 that determines that the unknown flow of network traffic and the classification signature exceed a threshold level of similarity by comparing the unknown flow with the classification signature. Exemplary system 100 may further include a modification module 110 that (1) identifies at least one attribute of the unknown flow that differs from the classification signature and then (2) modifies the classification signature based at least in part on the attribute of the unknown flow. Exemplary system 100 may also include a creation module 112 that creates a new classification signature used to classify network traffic.

Moreover, and as will be described in greater detail below, exemplary system 100 may include a prioritization module 120 that prioritizes modification of the classification signature over modification of at least one additional classification signature. Although illustrated as separate elements, one or more of modules 102 in FIG. 1 may represent portions of a single module or application (such as JUNIPER NETWORKS' JUNOS, CISCO SYSTEMS' INTERNETWORK OPERATING SYSTEM (IOS), ALCATEL-LUCENT'S SERVICE ROUTER OPERATING SYSTEM (SR OS), OPEN VSWITCH, FLOWVISOR, SNAC, PICA8, INDIGO, PANTOU, OPENFAUCET, OPENFLOWJ, NETTLE, PDX, NOX, MUL, JAXON, FLOODLIGHT, RYU, NODEFLOW, ROUTEFLOW, or RESONANCE).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as the devices illustrated in FIG. 2 (e.g., network device 202 and/or computing devices 206(1)-(N)), the devices illustrated in FIG. 6 (e.g., DPI box 602, analysis engine 604, testing engine 606, and/or ISP flow collector 608), and/or computing system 810 in FIG. 8.

As illustrated in FIG. 1, exemplary system 100 may also include one or more classification signatures, such as classification signature 114. The phrase "classification signature," as used herein, generally refers to any type or form of signature, heuristic, tool, and/or model capable of classifying network traffic. In one embodiment, classification signature 114 may correspond to a specific application. In this embodiment, classification signature 114 may include a plurality of features used to identify network traffic originating from the specific application. Additionally or alternatively, classification signature 114 may facilitate classifying network traffic originating from the specific application based at least in part on the plurality of features.

Examples of such features include, without limitation, an application signature (such as a hash) that identifies a specific application, a packet-number identifier that identifies which packet within a corresponding flow of network traffic includes the application signature, a payload-size identifier that identifies the payload size of a corresponding flow of network traffic or the payload size of the packet that includes the application signature, a keyword identifier that identifies a keyword included in a corresponding flow of network traffic, combinations of one or more of the same, or any other suitable features.

The term "application," as used herein, generally refers to any type or form of software, executable program, and/or operating system. Examples of such applications include, without limitation, Peer-to-Peer (P2P) applications, file-sharing applications, Voice-over-Internet-Protocol (VoIP) applications, audio applications, video applications, media-streaming applications, browsers, operating systems, plug-ins, virtual applications, cloud-based applications, Internet applications, widgets, scripts, combinations of one or more of the same, or any other suitable applications.

As illustrated in FIG. 1, exemplary system 100 may also include one or more unknown flows of network traffic, such as unknown flow 116. The term "flow" and the phrase "network traffic," as used herein, generally refer to any type or form of transfer of data within a network. Similarly, the phrase "unknown flow," as used herein, generally refers to any type or form of flow that does not match any available classification signatures and/or originates from an unknown application. In one embodiment, unknown flow 116 may include data encapsulated in one or more packets. Examples of such packets include, without limitation, Internet Protocol (IP) version 4 (IPv4) packets, IP version 6 (IPv6) packets, Gateway-to-Gateway Protocol packets, Internet Group Message Protocol (IGMP) packets, Transmission Control Protocol (TCP) packets, combinations of one or more of the same, or any other suitable packets.

As illustrated in FIG. 1, exemplary system 100 may also include one or more attributes of an unknown flow, such as attribute 118. The term "attribute," as used herein, generally refers to any type or form of characteristic, metadata, and/or information related to an unknown flow. Examples of attribute 118 include, without limitation, an application signature (such as a hash) that identifies the specific application that initiated the unknown flow, a number that identifies which packet within the unknown flow includes the application signature, the payload size of the unknown flow, the payload size of the packet that includes the application signature within the unknown flow, a keyword included in the unknown flow, combinations of one or more of the same, or any other suitable attribute.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication among network device 202 and computing devices 206(1)-(N). In one embodiment, network device 202 may be programmed with one or more of modules 102. In this embodiment, network device 202 may include classification signatures 114(1)-(N), unknown flows 116(1)-(N), and/or attributes 118(1)-(N). Although illustrated as a single device in FIG. 2, network device 202 may represent a plurality of network devices in communication with one another.

In one embodiment, one or more of modules 102 from FIG. 1 may, when executed by at least one processor of network device 202, enable network device 202 to automatically correct classification signatures 114(1)-(N) to account for varying versions of applications encountered within network 204. For example, and as will be described in greater detail below, one or more of modules 102 may cause network device 202 to (1) identify classification signatures 114(1) used to classify network traffic, (2) detect one or more instances of unknown flow 116(1), (3) determine that unknown flow 116(1) and classification signature 114(1) exceed a threshold level of similarity by comparing unknown flow 116(1) with classification signature 114(1), and then in response to determining that unknown flow 116(1) and classification signature 114(1) exceed the threshold level of similarity, (4) identify attribute 118(1) of unknown flow 116(1) that differs from classification signature 114(1) and (5) modify classification signature 114(1) based at least in part on attribute 118(1) of unknown flow 116(1).

Network device 202 generally represents any type or form of computing device capable of classifying network traffic. Examples of network device 202 include, without limitation, routers, switches, network hubs, gateways, network default gateways, nodes, servers, bridges, Field Programmable Gate Arrays (FPGAs), laptops, tablets, desktops, cellular phones, Personal Digital Assistants (PDAs), multimedia players, embedded systems, wearable devices (e.g., smart watches, smart glasses, etc.), gaming consoles, exemplary computing system 810 in FIG. 8, portions of one or more of the same, combinations of one or more of the same, or any other suitable network device. Although illustrated an external device, network device 202 may represent portions of network 204.

Computing devices 206(1)-(N) generally represents any type or form of computing device capable of reading computer-executable instructions. Examples of computing devices 206(1)-(N) include, without limitation, laptops, tablets, desktops, servers, cellular phones, FPGAs, PDAs, multimedia players, embedded systems, wearable devices (e.g., smart watches, smart glasses, etc.), gaming consoles, portions of one or more of the same, combinations of one or more of the same, exemplary computing system 810 in FIG. 8, or any other suitable computing devices.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, an Internet Service Provider (ISP) network, wireline network, Power Line Communications (PLC), a cellular network (e.g., a Global System for Mobile Communications (GSM) network), portions of one or more of the same, combinations of one or more of the same, or any other suitable network. Network 204 may facilitate communication or data transfer using wireless and/or wired connections.

Figure 3:
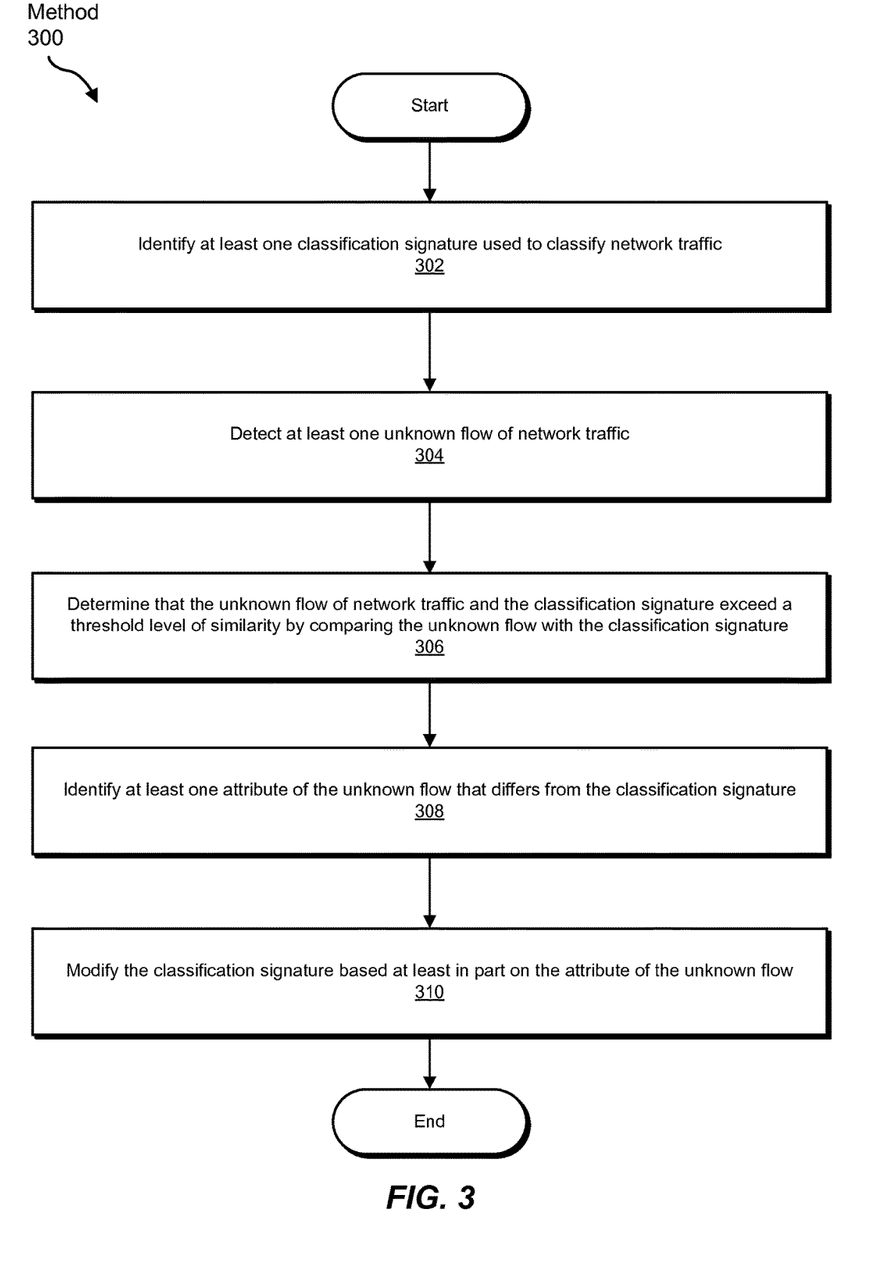
FIG. 3 is a flow diagram of an exemplary method for automatically correcting classification signatures.

FIG. 3 is a flow diagram of an exemplary computer-implemented method 300 for automatically correcting classification signatures. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, system 400 in FIG. 4, and/or computing system 810 in FIG. 8.

As illustrated in FIG. 3, at step 302 one or more of the systems described herein may identify at least one classification signature used to classify network traffic. For example, identification module 104 may, as part of network device 202 in FIG. 2, identify one or more of classification signatures 114(1)-(N). In this example, each of classification signatures 114(1)-(N) may correspond to a specific application. Additionally or alternatively, each of classification signature 114(1)-(N) may include a plurality of features used to identify network traffic originating from the corresponding specific application.

The systems described herein may perform step 302 in a variety of ways. In some examples, identification module 104 may identify a set of preexisting classification signatures. For example, identification module 104 may identify classification signatures 114(1)-(N) included in a classification software kit. However, each of classification signatures 114(1)-(N) identified within this classification software kit may have become ineffective in recognizing and/or classifying network traffic under certain conditions.

In one embodiment, classification signature 114(1) may no longer be effective in recognizing and/or classifying network traffic originating from a specific application due at least in part to the release of a newer and/or updated version of the specific application. For example, classification signature 114(1) may correspond to a specific version of SKYPE. In this example, classification signature 114(1) may be ineffective in recognizing and/or classifying network traffic originating from a newer and/or updated version of SKYPE.

Additionally or alternatively, classification signature 114 (N) may be ineffective in recognizing and/or classifying network traffic originating from a specific application that operates in a particular geographic region. For example, classification signature 114(1) may correspond to an American version of SKYPE that typically operates in the American market. In this example, classification signature 114(1) may be ineffective in recognizing and/or classifying network traffic originating from a Chinese version of SKYPE that typically operates in the Chinese market.

Figure 4:
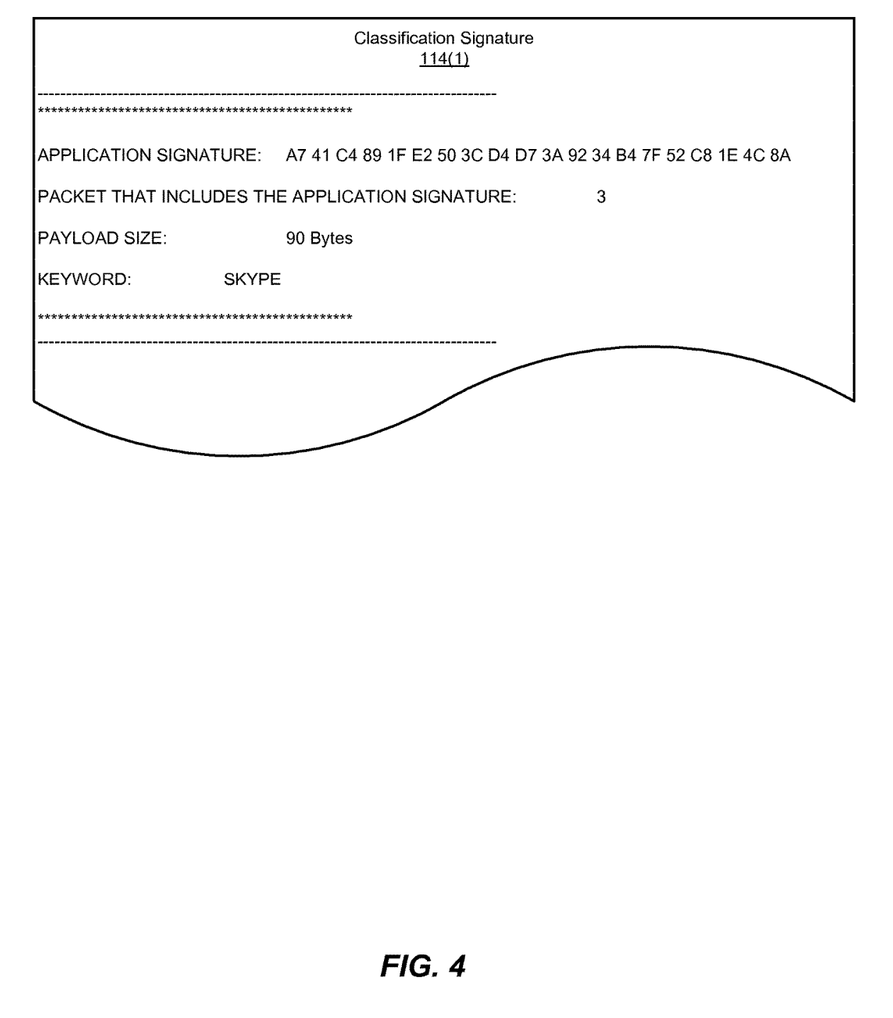
FIG. 4 is an illustration of an exemplary classification signature.

As illustrated in FIG. 4, classification signature 114(1) may include a plurality of features used to identify network traffic originating from a specific application (in this example, "SKYPE"). For example, classification signature 114(1) may identify the application signature that identifies the specific application (in this example, "A7 41 C4 89 1F E2 50 3C D4 D7 3A 92 34 B4 7F 52 C8 1E 4C 8A"), the specific packet that includes the application signature within a corresponding flow of network traffic (in this example, "3" or the third packet within a corresponding flow of network traffic), the payload size of a corresponding flow of network traffic (in this example, "90 Bytes"), and a keyword typically included in a corresponding flow of network traffic (in this example, "SKYPE").

In some examples, identification module 104 may identify at least one new classification signature. For example, creation module 112 may, as part of network device 202 in FIG. 2, create at least one new classification signature (not illustrated in FIG. 2) that was not previously included in the classification software kit. In this example, the new classification signature may correspond to a specific application. Additionally or alternatively, the new classification signature may include a plurality of features used to identify network traffic originating from the corresponding specific application.

After creation module 112 has created this new classification signature, identification module 104 may identify the new classification signature. Identification module 104 may then incorporate the new classification signature into the classification software kit. By incorporating the new classification signature into the classification software kit, identification module 104 may enable the classification software kit to recognize and/or classify network traffic originating from the corresponding specific application.

In some examples, identification module 104 may identify at least one classification signature imported from a different geographic region. For example, creation module 112 may import at least one classification signature from the Chinese market into the American market. In this example, the imported classification signature may correspond to a Chinese version of an application. Additionally or alternatively, the imported classification signature may include a plurality of features used to identify network traffic originating from the Chinese version of the application that typically operates in the Chinese market.

After creation module 112 has imported this classification signature, identification module 104 may identify the imported classification signature. Identification module 104 may then incorporate the imported classification signature into the classification software kit. By incorporating the imported classification signature into the classification software kit, identification module 104 may enable the classification software kit to recognize and/or classify network traffic originating from the Chinese version of the application.

Returning to FIG. 3, at step 304 one or more of the systems described herein may detect at least one unknown flow of network traffic. For example, detection module 106 may, as part of network device 202 in FIG. 2, detect one or more of unknown flows 116(1)-(N). In this example, unknown flows 116(1)-(N) may represent a plurality of instances of the same unknown flow of network traffic. Additionally or alternatively, each of unknown flows 116(1)-(N) may represent a unique instance of a different flow of network traffic.

The systems described herein may perform step 304 in a variety of ways. In some examples, detection module 106 may detect unknown flows 116(1)-(N) as part of an exchange between one or more of computing devices 206(1)-(N) in FIG. 2. For example, computing device 206(1) may initiate at least one flow of network traffic destined for computing device 206(N). In this example, the flow of network traffic may travel to network device 202 on the way to computing device 206(N) via network 204. As the flow of network traffic reaches network device 202, detection module 106 may detect the flow of network traffic.

Upon detection of the flow of network traffic, determination module 108 may determine that the flow does not match any of classification signatures 114(1)-(N). For example, determination module 108 may compare the detected flow of network traffic with each of classification signatures 114(1)-(N). Determination module 108 may then determine that the detected flow of network traffic does not match any of classification signatures 114(1)-(N) based at least in part on this comparison.

In one example, determination module 108 may determine that the detected flow of network traffic does not amount to an exact match with any of classification signatures 114(1)-(N). The phrase "exact match," as used herein, generally refers to any type or form of flow of network traffic whose attributes match each of the features included in a classification signature. In this example, the detected flow of network traffic may have attributes that match some, but not all, of the features included in at least one of classification signatures 114(1)-(N).

In one example, determination module 108 may determine that the flow of network traffic is unknown due at least in part to the flow not matching any of classification signatures 114(1)-(N). For example, the flow of network traffic may fail to match any of classification signatures 114(1)-(N). As a result, determination module 108 may determine that the flow of network traffic is unknown. Determination module 108 may then mark the flow of network traffic as unknown and/or add the flow of network traffic to unknown flows 116(1)-(N).

In some examples, detection module 106 may detect a plurality of instances of unknown flow 116(1). Additionally or alternatively, detection module 106 may detect a plurality of instances of unknown flow 116(N).

In some examples, detection module 106 may monitor the number of unknown flows encountered by network device 202 during discrete processing intervals. The phrase "discrete processing interval," as used herein, generally refers to any type or form of distinct and/or indefinite period of time. For example, detection module 106 may count the number of unknown flows encountered by network device 202 during a discrete processing interval. Once the number of unknown flows encountered during the discrete processing interval reaches a certain threshold, detection module 106 may conclude the discrete processing interval. Determination module 108 may then process and/or analyze the unknown flows encountered during the discrete processing interval.

Upon concluding the discrete processing interval, detection module 106 may begin another discrete processing interval. For example, detection module 106 may continue to count the number of unknown flows encountered by network device 202 during another discrete processing interval. Once the number of unknown flows encountered during the other discrete processing interval reaches the threshold, detection module 106 may conclude the other discrete processing interval. Determination module 108 may then process and/or analyze the unknown flows encountered during the other discrete processing interval.

Returning to FIG. 3, at step 306 one or more of the systems described herein may determine that the unknown flow of network traffic and the classification signature exceed a threshold level of similarity by comparing the unknown flow with the classification signature. For example, determination module 108 may, as part of network device 202 in FIG. 2, determine that one or more of unknown flows 116(1)-(N) and one or more of classification signatures 114(1)-(N) exceed a threshold level of similarity by comparing unknown flows 116(1)-(N) with classification signatures 114(1)-(N). The phrase "threshold level of similarity," as used herein, generally refers to any type or form of reference, value, and/or metric that represents a certain percentage and/or degree of similarity and/or likeness.

The systems described herein may perform step 306 in a variety of ways. In some examples, determination module 108 may compare attributes 118(1)-(N) of unknown flows 116(1)-(N) with the features of classification signatures 114(1)-(N). In one example, identification module 104 may identify a plurality of features of classification signature 114(1). For example, identification module 104 may identify the "A7 41 C4 89 1F E2 50 3C D4 D7 3A 92 34 B4 7F 52 C8 1E 4C 8A" application signature, the "3" packet-number identifier that identifies the third packet as including the application signature, the "90 Bytes" payload size, and the "SKYPE" keyword included in classification signature 114(1) in FIG. 4. As explained above, these features may be used to identify network traffic originating from a specific "SKYPE" application.

Additionally or alternatively, identification module 104 may identify a plurality of attributes of unknown flow 116(1). For example, identification module 104 may identify attributes 118(1), 118(2), 118(3), and 118(4) in FIG. 5. As illustrated in FIG. 5, attribute 118(1) may include the application signature of the application that initiated unknown flow 116(1) (in this example, "A7 41 C4 89 1F E2 50 3C D4 D7 3A 92 34 B4 7F 52 C8 1E 4C 8A"), attribute 118(2) may represent the specific packet that includes the application signature within unknown flow 116(1) (in this example, "3" or the third packet within unknown flow 116(1)), attribute 118(3) may represent the payload size of unknown flow 116(1) (in this example, "90 Bytes"), and attribute 118(4) may include a keyword identified within unknown flow 116(1) (in this example, "SKIPE"). These attributes may correspond to network traffic originating from an unrecognized and/or unknown version of the "SKYPE" application.

Upon identification of the features of classification signature 114(1) and attributes 118(1)-(4) of unknown flow 116(1), determination module 108 may determine the number of attributes 118(1)-(4) that match the features of classification signature 114(1). For example, determination module 108 may determine that attribute 118(1) of unknown flow 116(1) matches the "A7 41 C4 89 1F E2 50 3C D4 D7 3A 92 34 B4 7F 52 C8 1E 4C 8A" application signature included in classification signature 114(1) in FIG. 4. In this example, determination module 108 may also determine that attribute 118(2) of unknown flow 116(1) matches the "3" packet-number identifier included in classification signature 114(1) in FIG. 4. Determination module 108 may further determine that attribute 118(3) of unknown flow 116(1) matches the "90 Bytes" payload size identified in classification signature 114(1) in FIG. 4. Finally, determination module 108 may determine that attribute 118(4) of unknown flow 116(1) does not match the "SKYPE" keyword included in classification signature 114(1) in FIG. 4 (despite the similarity between attribute 118(4) and the "SKYPE" keyword).

Upon determining the number of attributes 118(1)-(4) that match the features of classification signature 114(1), determination module 108 may calculate the level of similarity between unknown flow 116(1) and classification signature 114(1). For example, determination module 108 may divide the number of attributes 118(1)-(N) that match the features of classification signature 114(1) by the total number of features of classification signature 114(1). In this example, determination module 108 may calculate a "95%" value that represents the level of similarity between unknown flow 116(1) and classification signature 114(1) based at least in part on the division.

Upon calculating the level of similarity between unknown flow 116(1) and classification signature 114(1), determination module 108 may compare this calculated level of similarity with the threshold level of similarity. For example, determination module 108 may compare the calculated "95%" value with a "90%" threshold level of similarity. Determination module 108 may determine that unknown flow 116(1) and classification signature 114(1) exceed the "90%" threshold level of similarity based at least in part on this comparison.

In one example, determination module 108 may determine that unknown flow 116(N) and classification signature 114(N) exceed the threshold level of similarity by comparing unknown flow 116(N) with classification signature 114(N). For example, identification module 104 may identify a plurality of features of classification signature 114(N). In this example, identification module 104 may also identify a plurality of attributes of unknown flow 116(N). Determination module 108 may then determine the number of attributes of unknown flow 116(N) that match the features of classification signature 114(N).

Upon determining the number of attributes of unknown flow 116(N) that match the features of classification signature 114(N), determination module 108 may calculate the level of similarity between unknown flow 116(N) and classification signature 114(N). Determination module 108 may compare this calculated level of similarity with the threshold level of similarity. Determination module 108 may then determine that unknown flow 116(N) and classification signature 114(N) exceed the threshold level of similarity based at least in part on this comparison.

Returning to FIG. 3, at step 308 one or more of the systems described herein may identify at least one attribute of the unknown flow that differs from the classification signature. For example, modification module 110 may, as part of network device 202 in FIG. 2, identify attribute 118(4) of unknown flow 116(1) as differing from the corresponding feature of classification signature 114(1). Modification module 110 may initiate this identification in response to the determination that unknown flow 116(1) and classification signatures 114(1) exceed the threshold level of similarity.

The systems described herein may perform step 308 in a variety of ways. In some examples, modification module 110 may receive a notification indicating that attribute 118(4) differs from the corresponding feature of classification signature 114(1). For example, and as described above, determination module 108 may determine that the "SKIPE" keyword included in attribute 118(4) in FIG. 5 does not match the "SKYPE" keyword included in classification signature 114(1) in FIG. 4. Upon determining that attribute 118(4) does not match the corresponding feature of classification signature 114(1), determination module 108 may notify modification module 110 of this difference between unknown flow 116(1) and classification signature 114(1). Modification module 110 may then determine that attribute 118(4) differs from the corresponding feature of classification signature 114(1) based at least in part on this notification.

Additionally or alternatively, modification module 110 may query determination module 108 to identify any attributes of unknown flow 116(1) that differ from the corresponding features of classification signature 114(1). In response to this query, determination module 108 may notify modification module 110 that the "SKIPE" keyword included in attribute 118(4) in FIG. 5 does not match the "SKYPE" keyword included in classification signature 114 (1) in FIG. 4. Modification module 110 may then determine that attribute 118(4) differs the corresponding feature of classification signature 114(1) based at least in part on this notification.

In some examples, modification module 110 may search unknown flow 116(1) for any attributes of unknown flow 116(1) that differ from the corresponding features of classification signature 114(1). For example, modification module 110 may search unknown flow 116(1) for metadata about the application that initiated unknown flow 116(1). During this search of unknown flow 116(1), modification module 110 may identify metadata that indicates and/or suggests that an application called "SKIPE" initiated unknown flow 116 (1). Modification module 110 may then determine that the "SKIPE" application that apparently initiated unknown flow 116(1) is not exactly the same as the "SKYPE" application identified by classification signature 114(1) in FIG. 4.

Returning to FIG. 3, at step 310 one or more of the systems described herein may modify the classification signature based at least in part on the attribute of the unknown flow. For example, modification module 110 may, as part of network device 202 in FIG. 2, modify classification signature 114(1) based at least in part on attribute 118(4) of unknown flow 116(1). Modification module 110 may initiate this modification in response to the determination that unknown flow 116(1) and classification signature 114(1) exceed the threshold level of similarity.

The systems described herein may perform step 310 in a variety of ways. In some examples, modification module 110 may replace the corresponding feature of classification signature 114(1) with attribute 118(4) of unknown flow 116(1). For example, modification module 110 may replace the "SKYPE" keyword included in classification signature 114 (1) in FIG. 4 with the "SKIPE" keyword included in attribute 118(4) in FIG. 5. Upon replacement of the "SKYPE" keyword, classification signature 114(1) may correspond to the same "SKIPE" application that initiated unknown flow 116(1).

Additionally or alternatively, modification module 110 may add attribute 118(4) of unknown flow 116(1) to classification signature 114(1). For example, modification module 110 may add the "SKIPE" keyword included in attribute 118(4) in FIG. 5 to classification signature 114(1) in FIG. 4. In this example, classification signature 114(1) may retain the "SKYPE" keyword despite the addition of the "SKIPE" keyword included in attribute 118(4). As a result, classification signature 114(1) may correspond to both the "SKYPE" application previously identified by classification signature 114(1) and the "SKIPE" application that initiated unknown flow 116(1).

In some examples, determination module 108 may test modified classification signature 114(1) (not illustrated in FIG. 4) against live network traffic to ensure that modified classification signature 114(1) exceeds a threshold level of accuracy. The phrase "threshold level of accuracy," as used herein, generally refers to any type or form of reference, value, and/or metric that represents a certain percentage and/or degree of accuracy and/or precision. For example, detection module 106 may detect one or more flows of live network traffic. Upon detection of the flows of live network traffic, determination module 108 may determine that the flows match modified classification signature 114(1) by comparing the flows with modified classification signature 114(1).

Additionally or alternatively, determination module 108 may determine that each of the flows of live network traffic amounts to an exact match with modified classification signature 114(1). In other words, the flows of live network traffic may have attributes that match all of the features included in modified classification signature 114(1).

As part of this test of modified classification signature 114(1), determination module 108 may verify that modified classification signature 114(1) exceeds the threshold level of accuracy. For example, determination module 108 may verify that modified classification signature 114(1) does not produce an unacceptable number of false positives. Additionally or alternatively, determination module 108 may verify that modified classification signature 114(1) does not produce an unacceptable number of false negatives.

As a specific example, the threshold level of accuracy may require a 100-percent level of accuracy over a certain period of time and/or with respect to a certain number of classifications. In this example, determination module 108 may verify that modified classification signature 114(1) satisfies the 100-percent level of accuracy required by the threshold. For example, determination module 108 may verify that modified classification signature 114(1) does not produce any false positives or false negatives over a certain period of time and/or with respect to a certain number of classifications.

Exemplary method 300 may also include one or more additional steps (not illustrated in FIG. 3). In some examples, one or more of the systems described herein may prioritize modification of at least one classification signature over at least one additional classification signature. For example, prioritization module 120 may, as part of network device 202 in FIG. 2, prioritize modification of classification signature 114(1) over modification of classification signature 114(N). In this example, prioritization module 120 may initiate this prioritization in response to a determination that the number of detected instances of unknown flow 116(1) exceeds the number of detected instances of unknown flow 116(N).

In one embodiment, all or a portion of exemplary system 100 may represent portions of exemplary system 600 in FIG. 6. As shown in FIG. 6, system 600 may include a DPI box 602 and an analysis engine 604 that receive network traffic 612 in parallel from network 204. Upon receiving network traffic 612, DPI box 602 may perform a DPI technique on network traffic 612. As part of this DPI technique, DPI box 602 may attempt to classify the flows included in network traffic 612 by comparing the flows with classification signatures 114(1)-(N).

In one example, DPI box 602 may forward classified flows 614 to ISP flow collector 608. Classified flows 614 may include any flows that matched at least one of classification signatures 114(1)-(N). Classified flows 614 may also identify the applications that initiated the flows included in network traffic 612. The ISP that controls network 204 may collect and/or maintain classified flows 614 in ISP flow collector 608. By collecting and/or maintaining classified flows 614 in ISP collector 608, the ISP may monitor, manipulate, direct, and/or filter network traffic based at least in part on classified flows 614.

In one example, DPI box 602 may notify analysis engine 604 of unknown flows 616 included in network traffic 612.

Unknown flows 616 may include any flows that did not match at least one of classification signatures 114(1)-(N). Analysis engine 604 may identify unknown flows 616 based at least in part on this notification. Analysis engine 604 may then process and/or analyze unknown flows 616 to predict which of classification signatures 114(1)-(N) need modification and/or correction.

Upon processing and/or analyzing unknown flows 616, analysis engine 604 may modify and/or correct one or more classification signatures 114(1)-(N) in the determined order of priority based at least in part on this prediction. Analysis engine 604 may then forward flow data 618 to testing engine 606. Flow data 618 may include various characteristics, metadata, and/or information related to unknown flows 616. Additionally or alternatively, flow data 618 may include one or more classification signatures 114(1)-(N) that have been modified and/or corrected by analysis engine 604.

Upon receiving flow data 618 from analysis engine 604, testing engine 606 may test one or more of the modified and/or classified signatures 114(1)-(N) included in flow data 618 to ensure that these modified classification signatures satisfy a threshold level of accuracy (e.g., a 100-percent level of accuracy). Testing engine 606 may then forward modified signatures 620 to DPI box 602. Modified signatures 620 may include one or more of classification signatures 114(1)-(N) that satisfied the threshold level of accuracy during testing by testing engine 606. Additionally or alternatively, modified signatures 620 may include one or more new classification signatures.

Upon receiving modified signatures 620, DPI box 602 may then apply modified signatures 620 to the DPI technique performed on network traffic received from network 204. As part of this DPI technique, DPI box 602 may attempt to classify the flows included in this network traffic by comparing the flows with modified signatures 620.

System 600 may automatically modify and/or correct classification signatures 114(1)-(N) on a substantially continuous basis. By automatically modifying and/or correcting classification signatures 114(1)-(N) on a substantially continuous basis, system 600 may increase the accuracy of classification signatures 114(1)-(N) to account for varying versions of applications encountered within network 204 over time.

In one embodiment, DPI box 602, analysis engine 604, testing engine 606, and/or ISP flow collector 608 may represent portions of network device 202 in FIG. 2. Additionally or alternatively, DPI box 602, analysis engine 604, testing engine 606, and/or ISP flow collector 608 may represent portions of one or more other network devices (not illustrated in FIG. 2).

Figure 7:
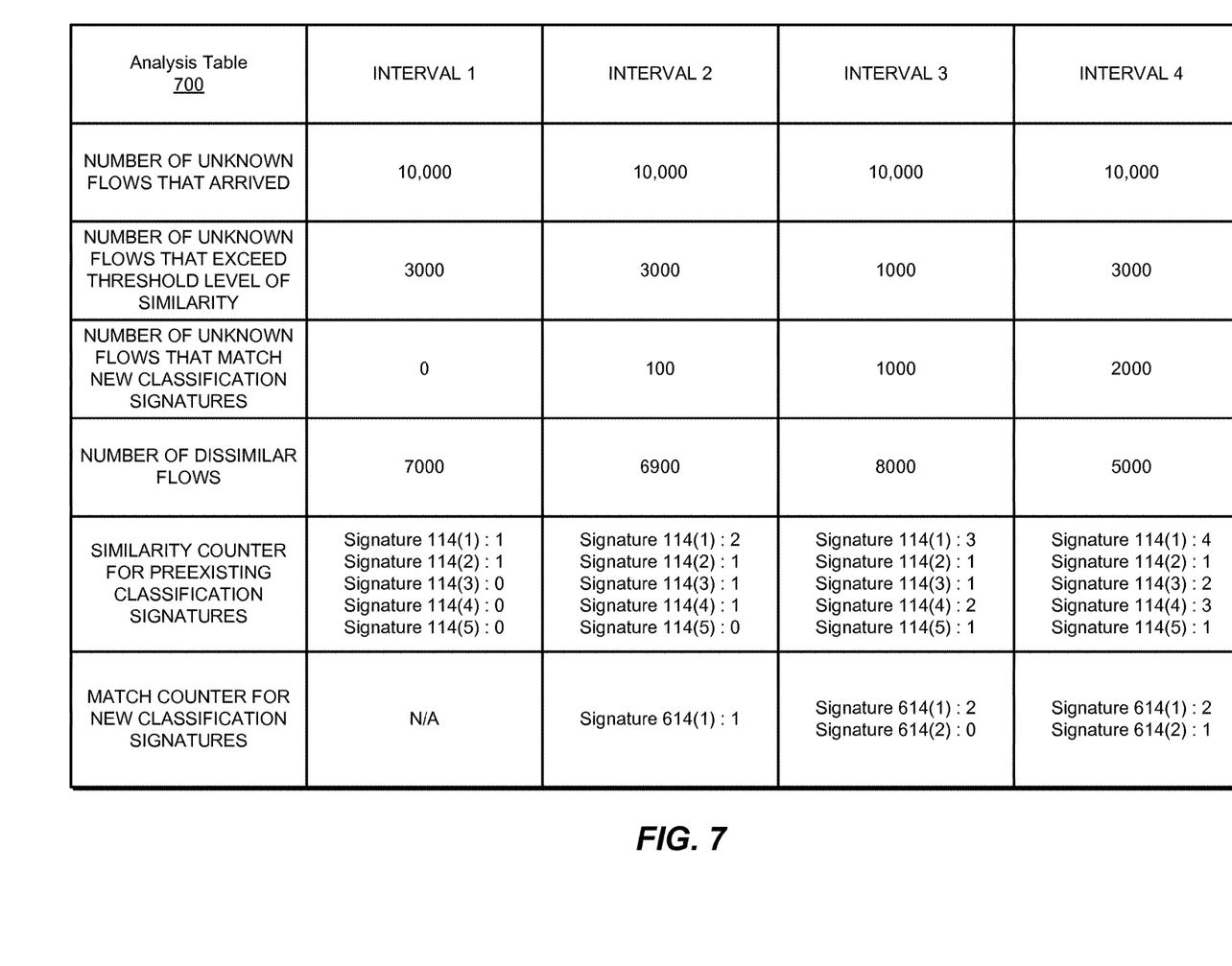
FIG. 7 is an illustration of an exemplary analysis table that identifies results of a prediction analysis.

FIG. 7 is an illustration of an exemplary analysis table that identifies results of a prediction analysis. As illustrated in FIG. 7, analysis table 700 may identify and/or track various statistics of unknown flows encountered during discrete processing intervals of the prediction analysis. During the first processing interval (in this example, "INTERVAL 1"), 10,000 unknown flows may arrive at analysis engine 604, 3,000 of these unknown flows may exceed the threshold level of similarity with respect to classification signature 114(1) or 114(2), none of these unknown flows may match any new classification signatures, and 7,000 of these unknown flows may fail to exceed the threshold level of similarity with respect to any classification signatures.

During the second processing interval (in this example, "INTERVAL 2"), 10,000 unknown flows may arrive at analysis engine 604, 3,000 of these unknown flows may exceed the threshold level of similarity with respect to classification signature 114(1), 114(3), or 114(4), 100 of these unknown flows may match new classification signature 614(1), and 6,900 of these unknown flows may fail to exceed the threshold level of similarity with respect to any classification signatures.

During the third processing interval (in this example, "INTERVAL 3"), 10,000 unknown flows may arrive at analysis engine 604, 1,000 of these unknown flows may exceed the threshold level of similarity with respect to classification signature 114(1), 114(4), or 114(5), 1,000 of these unknown flows may match new classification signature 614(1), and 8,000 of these unknown flows may fail to exceed the threshold level of similarity with respect to any classification signatures.

During the fourth processing interval (in this example, "INTERVAL 4"), 10,000 unknown flows may arrive at analysis engine 604, 3,000 of these unknown flows may exceed the threshold level of similarity with respect to classification signature 114(1), 114(3), or 114(4), 2,000 of these unknown flows may match new classification signature 614(2), and 5,000 of these unknown flows may fail to exceed the threshold level of similarity with respect to any classification signatures.

As illustrated in FIG. 7, a similarity counter may identify a running count of which classification signatures 114(1)-(5) are most frequently sufficiently similar to unknown flows during the discrete processing intervals. At the end of the prediction analysis, prioritization module 120 may prioritize modification of classification signatures 114(1)-(5) based at least in part on the similarity counter. For example, prioritization module 120 may prioritize modification of classification signature 114(1) over modification of classification signatures 114(2)-(5) since unknown flows exceed the threshold level of similarity with respect to classification signature 114(1) during all four discrete processing intervals. Additionally or alternatively, prioritization module 120 may prioritize modification of classification signature 114(4) over modification of classification signatures 114(2), 114(3), and 114(5) since unknown flows exceed the threshold level of similarity with respect to classification signature 114(4) during three of the four discrete processing intervals.

As illustrated in FIG. 7, a match counter may identify a running count of which new classification signatures 614(1)-(2) are most frequently matched by unknown flows during the discrete processing intervals. At the end of the prediction analysis, determination module 108 may determine whether new classification signatures 614(1)-(2) exceed the threshold level of accuracy based at least in part on the match counter. For example, determination module 108 may ensure that new classification signature 614(1) exceeds the threshold level of accuracy since unknown flows matched classification signature 114(1) during a sufficient number of discrete processing intervals.

The prediction analysis may include one or more additional intervals not illustrated in FIG. 7. For example, the prediction analysis may include a total of 100 discrete processing intervals. In this example, the 100 discrete processing intervals may enable system 600 in FIG. 6 to predict whether any of classification signatures 114(1)-(5) need modification and/or determine the order of priority for modifying classification signatures 114(1)-(5).

As explained above, by determining that an unknown flow of network traffic and a classification signature exceed a threshold level of similarity, a DPI system may determine that the unknown flow likely originated from an application related to the classification signature (e.g., from a different version of the application identified by the classification signature). Upon determining that the unknown flow likely originated from an application related to the classification signature, the DPI system may identify at least one attribute of the unknown flow that differs from the classification signature and then modify the classification signature based at least in part on the attribute of the unknown flow. In doing so, the DPI system may automatically correct this classification signature to account for varying versions of the application encountered within a network, thereby increasing the accuracy of the classification signature.

Figure 8:
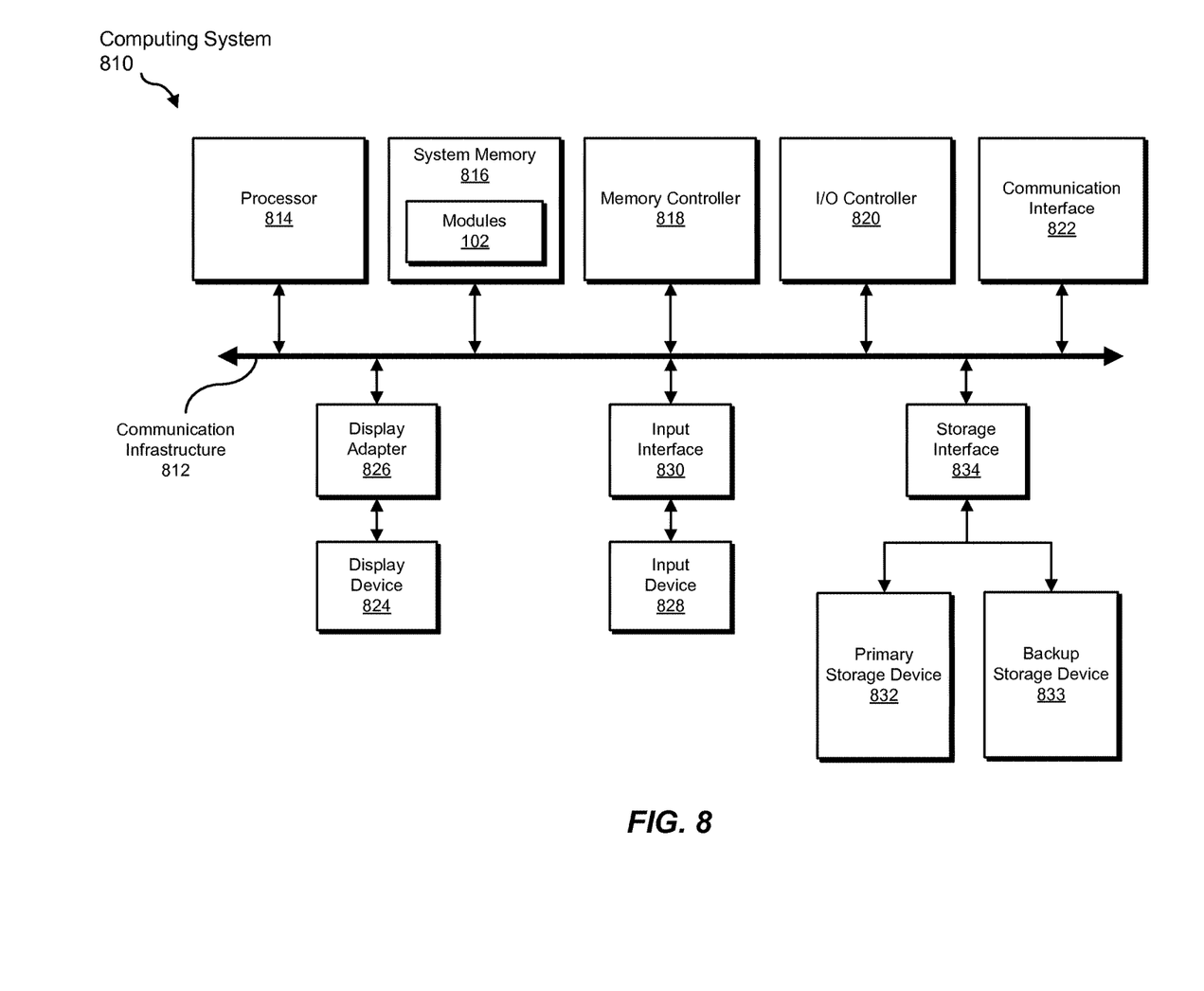
FIG. 8 is a block diagram of an exemplary computing system capable of implementing and/or being used in connection with one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 3. All or a portion of computing system 800 may also perform and/or be a means for performing and/or implementing any other steps, methods, or processes described and/or illustrated herein.

Computing system 800 broadly represents any type or form of electrical load, including a single or multi-processor computing device or system capable of executing computer-readable instructions. Examples of computing system 800 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 800 may be programmed, configured, and/or otherwise designed to comply with one or more networking protocols. According to certain embodiments, computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. Processor 814 may represent an application-specific integrated circuit (ASIC), a system on a chip (e.g., a network processor), a hardware accelerator, a general purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below). System memory 816 may be implemented as shared memory and/or distributed memory in a network device. Furthermore, system memory 816 may store packets and/or other information used in networking operations.

In certain embodiments, exemplary computing system 800 may also include one or more components or elements in addition to processor 814 and system memory 816. For example, as illustrated in FIG. 8, computing system 800 may include a memory controller 818, an Input/Output (I/O) controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for automatically correcting classification signatures, at least a portion of the method being performed by a computing device comprising at least one processor, the method comprising:
   identifying at least one classification signature used to classify network traffic;
   detecting at least one unknown flow of network traffic;
   determining that the unknown flow of network traffic and the classification signature exceed a threshold level of similarity by comparing the unknown flow with the classification signature by:
      identifying a plurality of features of the classification signature;
      identifying a plurality of attributes of the unknown flow of network traffic;
      determining the number of attributes of the unknown flow that match the features of the classification signature;
      determining, based at least in part on the number of attributes of the unknown flow that match the features of the classification signature, that the unknown flow of network traffic and the classification signature exceed the threshold level of similarity;
   in response to determining that the unknown flow and the classification signature exceed the threshold level of similarity:
      identifying at least one attribute of the unknown flow that differs from the classification signature;
      modifying the classification signature based at least in part on the attribute of the unknown flow.

2. The method of claim 1, wherein:
   identifying the classification signature used to classify network traffic comprises identifying a set of classification signatures used to classify network traffic;
   detecting the unknown flow of network traffic comprises determining that the unknown flow does not match any of the classification signatures within the set.

3. The method of claim 1, wherein detecting the unknown flow of network traffic comprises:
   detecting a plurality of instances of the unknown flow of network traffic;
   detecting a plurality of instances of at least one additional unknown flow of network traffic;
   determining that the number of instances of the unknown flow exceeds the number of instances of the additional unknown flow.

4. The method of claim 3, further comprising:
   determining that the additional unknown flow of network traffic and at least one additional classification signature exceed a threshold level of similarity by comparing the additional unknown flow with the additional classification signature;
   in response to determining that the number of instances of the unknown flow exceeds the number of instances of the additional unknown flow, prioritizing modification of the classification signature over modification of the additional classification signature.

5. The method of claim 4, wherein prioritizing the modification of the classification signature over the modification of the additional classification signature comprises initiating the modification of the classification signature prior to the modification of the additional classification signature.

6. The method of claim 1, wherein the classification signature comprises at least one of:
   an application signature that identifies an application;
   a packet-number identifier that identifies which packet within a corresponding flow of network traffic includes the application signature;
   a payload-size identifier that identifies the payload size of a corresponding flow of network traffic.

7. The method of claim 1, wherein identifying the classification signature used to classify network traffic comprises at least one of:
   creating a new classification signature used to classify network traffic;
   importing, from a different geographic region, a new classification signature that has been used to classify network traffic in the different geographic region.

8. The method of claim 1, wherein identifying the classification signature used to classify network traffic comprises identifying a preexisting classification signature used to classify network traffic in the same geographic region at which the unknown flow of network traffic is detected.

9. The method of claim 1, further comprising:
   testing the modified classification signature against live network traffic;
   verifying, based at least in part on the test, that the modified classification signature exceeds a threshold level of accuracy.

10. The method of claim 9, further comprising:
    upon verifying the accuracy of the modified classification signature:
       detecting at least one flow of live network traffic;
       determining that the flow of live network traffic matches the modified classification signature by comparing the flow with the modified classification signature.

11. The method of claim 1, wherein:
    identifying the attribute of the unknown flow that differs from the classification signature comprises:
       searching the unknown flow for metadata about an application that initiated the unknown flow;
       during the search, identifying metadata about the application within the unknown flow;
    modifying the classification signature based at least in part on the attribute of the unknown flow comprises modifying the classification signature based at least in part on the metadata about the application identified within the unknown flow.

12. A system for automatically correcting classification signatures, the system comprising:
    an identification module, stored in memory, that:
       identifies at least one classification signature used to classify network traffic; and
       identifies a plurality of features of the classification signature;
    a detection module, stored in memory, that detects at least one unknown flow of network traffic;
    wherein the identification module further identifies a plurality of attributes of the unknown flow of network traffic;
    a determination module, stored in memory, that determines that the unknown flow of network traffic and the classification signature exceed a threshold level of similarity by comparing the unknown flow with the classification signature by
       determining the number of attributes of the unknown flow that match the features of the classification signature;
       determining, based at least in part on the number of attributes of the unknown flow that match the features of the classification signature, that the unknown flow of network traffic and the classification signature exceed the threshold level of similarity;

a modification module, stored in memory, that, in response to the determination that the unknown flow and the classification signature exceed the threshold level of similarity:
- identifies at least one attribute of the unknown flow that differs from the classification signature;
- modifies the classification signature based at least in part on the attribute of the unknown flow;

at least one physical processor that executes the identification module, the detection module, the determination module, and the modification module.

13. The system of claim 12, wherein:
the identification module identifies a set of classification signatures used to classify network traffic;
the determination module determines that the unknown flow does not match any of the classification signatures within the set.

14. The system of claim 12, wherein:
the detection module:
- detects a plurality of instances of the unknown flow of network traffic;
- detects a plurality of instances of at least one additional unknown flow of network traffic;
the determination module determines that the number of instances of the unknown flow exceeds the number of instances of the additional unknown flow.

15. The system of claim 14, wherein the determination module further determines that the additional unknown flow of network traffic and at least one additional classification signature exceed a threshold level of similarity by comparing the additional unknown flow with the additional classification signature;
further comprising a prioritization module that, in response to the determination that the number of instances of the unknown flow exceeds the number of instances of the additional unknown flow, prioritizes modification of the classification signature over modification of the additional classification signature.

16. The system of claim 15, wherein the modification module initiates the modification of the classification signature prior to the modification of the additional classification signature due at least in part to the priority of the modification of the classification signature.

17. The system of claim 12, wherein the classification signature comprises at least one of:
- an application signature that identifies an application;
- a packet-number identifier that identifies which packet within a corresponding flow of network traffic includes the application signature;
- a payload-size identifier that identifies the payload size of a corresponding flow of network traffic.

18. A non-transitory computer-readable medium comprising one or more computer-executable instructions that, when executed by at least one processor of a computing device, cause the computing device to:
- identify at least one classification signature used to classify network traffic;
- detect at least one unknown flow of network traffic;
- determine that the unknown flow of network traffic and the classification signature exceed a threshold level of similarity by comparing the unknown flow with the classification signature by:
  - identifying a plurality of features of the classification signature;
  - identifying a plurality of attributes of the unknown flow of network traffic;
  - determining the number of attributes of the unknown flow that match the features of the classification signature;
  - determining, based at least in part on the number of attributes of the unknown flow that match the features of the classification signature, that the unknown flow of network traffic and the classification signature exceed the threshold level of similarity;
- in response to determining that the unknown flow and the classification signature exceed the threshold level of similarity:
  - identify at least one attribute of the unknown flow that differs from the classification signature;
  - modify the classification signature based at least in part on the attribute of the unknown flow.

* * * * *